(12) United States Patent
Voit et al.

(10) Patent No.: US 9,088,619 B2
(45) Date of Patent: Jul. 21, 2015

(54) QUALITY OF SERVICE BASED ON LOGICAL PORT IDENTIFIER FOR BROADBAND AGGREGATION NETWORKS

(75) Inventors: Eric Voit, Bethesda, CA (US); Richard Manfred Pruss, Marcoola (AU); Yves Hertoghs, Schilde (BE); John William Evans, London (GB)

(73) Assignee: Cisco Technology, Inc., San Jose, CA (US)

( * ) Notice: Subject to any disclaimer, the term of this patent is extended or adjusted under 35 U.S.C. 154(b) by 1994 days.

(21) Appl. No.: 11/227,722

(22) Filed: Sep. 14, 2005

(65) Prior Publication Data

US 2007/0076607 A1   Apr. 5, 2007

(51) Int. Cl.
*H04L 29/12*   (2006.01)
*H04L 12/26*   (2006.01)

(52) U.S. Cl.
CPC ............. *H04L 61/2015* (2013.01); *H04L 12/26* (2013.01)

(58) Field of Classification Search
CPC ..... H04L 61/10; H04L 61/2015; H04L 12/00; H04L 12/14; H04L 12/18; H04L 12/26; H04L 12/2801
USPC .................. 370/230, 235, 229, 252
See application file for complete search history.

(56) References Cited

U.S. PATENT DOCUMENTS

| | | | |
|---|---|---|---|
| 5,331,637 A | 7/1994 | Francis et al. | |
| 5,848,277 A | 12/1998 | Sheu | |
| 6,055,364 A | 4/2000 | Speakman et al. | |
| 6,073,176 A | 6/2000 | Baindur et al. | |
| 6,078,590 A | 6/2000 | Farinacci et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,373,838 B1 | 4/2002 | Law et al. | |

(Continued)

FOREIGN PATENT DOCUMENTS

| | | |
|---|---|---|
| WO | WO 2007/031002 A | 3/2007 |
| WO | WO 2008/089370 | 7/2008 |

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner* — Anh Ngoc Nguyen
(74) *Attorney, Agent, or Firm* — Baker Botts L.L.P.

(57) ABSTRACT

A provider edge (PE) device provides subscribers with access to an Internet Service Provider (ISP) network. The subscribers are connected to the PE device via a broadband aggregation device. The PE device includes a processor operable to snoop control plane traffic for a logical identifier that allows subscriber traffic having varying data plane information to be treated as a session group. The processor is further operable to instantiate the session group based on the logical identifier. A unit of the PE device applies a QOS policy to traffic flow associated with the session group. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

13 Claims, 7 Drawing Sheets

(56) References Cited

U.S. PATENT DOCUMENTS

| | | |
|---|---|---|
| 6,424,657 B1 | 7/2002 | Voit et al. |
| 6,430,621 B1 | 8/2002 | Srikanth et al. |
| 6,484,209 B1 | 11/2002 | Momirov |
| 6,502,140 B1 | 12/2002 | Boivie |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |
| 6,785,265 B2 | 8/2004 | White et al. |
| 6,789,121 B2 | 9/2004 | Lamberton et al. |
| 6,798,775 B1 | 9/2004 | Bordonaro |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,542 B2 | 2/2005 | Tzeng |
| 6,852,542 B2 | 2/2005 | Mandel et al. |
| 6,879,594 B1 | 4/2005 | Lee et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,016,351 B1 | 3/2006 | Farinacci et al. |
| 7,047,304 B2 * | 5/2006 | Senapati et al. ............. 709/229 |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,315,554 B2 | 1/2008 | Baum et al. |
| 7,345,991 B1 | 3/2008 | Shabtay et al. |
| 7,408,936 B2 | 8/2008 | Ge et al. |
| 7,466,703 B1 | 12/2008 | Arunachalam et al. |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0196795 A1 | 12/2002 | Higashiyama |
| 2003/0012183 A1 | 1/2003 | Butler |
| 2003/0036375 A1 * | 2/2003 | Chen et al. ............. 455/403 |
| 2003/0101243 A1 * | 5/2003 | Donahue et al. ............. 709/220 |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0107382 A1 | 6/2004 | Doverspike et al. |
| 2004/0125809 A1 | 7/2004 | Jeng |
| 2004/0133619 A1 | 7/2004 | Zelig et al. |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0213201 A1 | 10/2004 | Osterlund |
| 2004/0228291 A1 * | 11/2004 | Huslak et al. ............. 370/260 |
| 2004/0230444 A1 * | 11/2004 | Holt et al. ............. 705/1 |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044265 A1 * | 2/2005 | Vinel et al. ............. 709/238 |
| 2005/0063397 A1 | 3/2005 | Wu et al. |
| 2005/0068972 A1 | 3/2005 | Burns et al. |
| 2005/0089047 A1 | 4/2005 | Ould-Brahim et al. |
| 2005/0099949 A1 | 5/2005 | Mohan et al. |
| 2005/0152370 A1 * | 7/2005 | Meehan et al. ............. 370/393 |
| 2005/0157664 A1 | 7/2005 | Baum |
| 2005/0157751 A1 | 7/2005 | Rabie et al. |
| 2005/0175022 A1 | 8/2005 | Nishimura et al. |
| 2005/0190773 A1 | 9/2005 | Yang et al. |
| 2005/0239445 A1 | 10/2005 | Karaogguz et al. |
| 2005/0249124 A1 | 11/2005 | Elie-Dit-Cosaque et al. |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0126496 A1 | 6/2006 | Filsfils et al. |
| 2006/0182037 A1 | 8/2006 | Chen et al. |
| 2006/0248277 A1 | 11/2006 | Pande |
| 2006/0262794 A1 | 11/2006 | Livet et al. |
| 2006/0285500 A1 | 12/2006 | Booth |
| 2006/0285501 A1 | 12/2006 | Damm |
| 2007/0076719 A1 | 4/2007 | Allan et al. |

OTHER PUBLICATIONS

Do-Wire Edge-To Edge (PWE3) Working Group, Simon Delord, UECOMM; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2, Oct. 1, 2005, XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.

Blunk et al. Draft RFC 2284—Extensible Authentication Protocol EAP, Feb. 2004; http://tools.ieff.org/html/draft-ietf-eap-rfc2284bis-09.

Light Reading, Inc., Distributed-Edge Artecture, Nov. 25, 2003.

Landron, Use of the IEEE Assigned Type Field with IEEE std 802.3, 1998 Edition Local and Metropolian Area Networks, Apr. 16, 2004.

Marc Lasserre et al., "Virtual Private LAN Services over MPLS", Mar. 2003, Internet Draft Document, pp. 4-22; http://tools.ietf.org/html/draft-lasserre-vkompella-ppvpn-vpls-04.

* cited by examiner

QUALITY OF SERVICE BASED ON LOGICAL PORT IDENTIFIER FOR BROADBAND AGGREGATION NETWORKS

FIELD OF THE INVENTION

The present invention relates generally to data communications systems; more specifically, to Quality of Service (QoS) functions and mechanisms for providing consistent, predictable data delivery in broadband aggregation networks.

BACKGROUND OF THE INVENTION

Digital Subscriber Line (DSL) technology is widely-used today for increasing the bandwidth of digital data transmissions over the existing telephone network infrastructure. Other types of Layer 1 (L1) transport mechanisms in use include Fiber-To-The-Home (FTTH) and WIMAX. In a typical system configuration, a plurality of DSL subscribers are connected to a service provider (SP) network through a Digital Subscriber Line Access Multiplexer (DSLAM), which concentrates and multiplexes signals at the telephone service provider location to the broader wide area network (WAN). Basically, a DSLAM takes connections from many customers or subscribers and aggregates them onto a single, high-capacity connection. The DSLAM may also provide additional functions such as Internet Protocol (IP) address assignment for the subscribers, IP Access Control Lists (ACLs), etc.

Asynchronous Transfer Mode (ATM) protocol networks have traditionally been utilized for communications between DSLAM devices and Broadband Remote Access Servers (BRAS) that provide authentication and subscriber management functions. A BRAS is a device that terminates remote users at the corporate network or Internet users at the Internet service provider (ISP) network, and commonly provides firewall, authentication, and routing services for remote users. Next generation BRAS devices are frequently referred to as Broadband Network Gateway (BBNG) devices.

The ATM protocol is an international standard in which multiple service types (such as voice, video, or data) are conveyed in fixed-length "cells" over point-to-point network connections. Data packet cells travel through the ATM switches from the user network interface (UNI) to the network node interface (NNI) through a process called Virtual Path Identifier/Virtual Channel Identifier (VPI/VCI) translation. The VPI/VCI identifiers are used by the ATM switches to switch/direct the subscriber traffic to a given feature server, and in the reverse direction to forward server traffic to a given DSLAM/subscriber, without ambiguity. Furthermore, the VPI/VCI mechanism is used by the feature server to identify the subscriber.

By way of background, U.S. Pat. No. 6,801,533, for example, teaches a system and method for proxy signaling in a DSLAM and generally describes a DSL network that includes communication transfer of signals from a DSLAM to a remote access server over a high-speed ATM network. Transmission of packet data over an ATM network is also taught in U.S. Pat. No. 6,785,232. U.S. Pat. No. 5,818,842 teaches a communication system with an interface device that connects a plurality of interconnected ATM switches to Local Area Network (LAN) interface adapters for connection to LAN networks.

Many service provider (SP) networks are being migrated away from ATM protocol networks to Ethernet networks. Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (also referred to as "bridges") to implement an Ethernet "cloud" or "island" that provides connectivity to the attached devices. The switch functions as an intelligent data traffic forwarder in which frames are sent to ports where the destination device is attached. Examples of network switches for use in Ethernet network environments are found in U.S. Pat. Nos. 6,850,542, 6,813,268 and 6,850,521.

Regardless of the network technology employed, IP Quality of Service (QoS) management is usually needed both to prioritize some applications, ensuring that they receive minimized data delivery delay and assured bandwidth, and to efficiently utilize the available bandwidth of the network. This IP QoS management is typically achieved using mechanisms such as policing, shaping, and queuing.

Traffic policing mechanisms commonly rely on a token bucket algorithm to enforce a maximum rate sent (egress) or received (ingress) for traffic at any given moment. A policer typically regulates traffic by dropping data packets when the rate of traffic exceeds the specified rate limit.

Traffic shaping typically delays excess traffic using a buffer or queuing mechanism to hold packets and shape the flow when the data rate of the source is higher than expected. Generic Traffic Shaping (GTS), Class-Based Traffic Shaping (CBTS), Distributed Traffic Shaping (DTS) and Frame Relay Traffic Shaping (FRTS) are examples of shaping mechanisms. Shaping may be applied to the output of a single first-in-first-out (FIFO) queue, or may be applied to a number of queues using an IP queuing scheme where traffic is classified into queues based on context information in the IP header, such as the source or destination address. These queues may then be serviced using a queuing algorithm such as a class-based weighted fair queue (CBWFQ), for example.

A primary reason for using traffic shaping is to regulate traffic in order to avoid congestion that can occur when the sent traffic exceeds the access speed of its remote, target interface. Examples of traffic shaping mechanisms are found in U.S. Patent Publication No. 2005/0163049, which teaches a packet shaper that ensures proper packet transmission within user-specific minimum bandwidth; and U.S. Patent Publication No. 2005/0163049, which teaches a method and apparatus for classifying packets in a data processing device according to a plurality of context-specific sets of processing rules based on context identifiers associated with representative data packets.

QoS functions such as shaping have been traditionally performed on a physical port in order to reduce the total amount of traffic sent to the next box in a network. However, in the case of DSL and FTTH, often times the next Layer 2 (L2) hop is a DSLAM that lacks the ability to perform IP QoS functions. For example, many DSLAMs are unable to perform Class-Based Queuing (CPQ) based on widely used protocols such as the Dynamic Host Configuration Protocol (DHCP) or the IEEE 802.1P specification, which enables Layer 2 switches to prioritize traffic and perform dynamic multicast filtering. (The 802.1P specification works at the media access control (MAC) framing layer, and includes a three-bit header field for prioritization, which allows packets to be grouped into various traffic classes.) This means that if there are facility constraints beyond the next L2 hop which might randomly drop frames without regard for the encapsulated DSCP or 802.1P, Service Level Agreements (SLAs) that set expectations between the customer and provider could be harmed.

In ATM-based architectures such as the DSL Forum TR-59 specification, the DSLAM cannot, or is not trusted to perform IP QOS functions. In this case if the rate of a subscriber line at the DSLAM is exceeded, traffic may be discarded indiscriminately of IP QOS markings. To avoid this shaping is applied at the BRAS based upon layer 2 context such as the ATM VPI/VCI, in order to limit the traffic before it arrives at the DSLAM. The VPI/VCI represents a particular subscriber line on the DSLAM, and traffic to that VPI/VCI is shaped in order to enforce a maximum rate for traffic sent to that line, and to ensure that the physical rate of the DSL line going between the DSLAM and the subscriber is not exceeded. This type of shaping may be used in conjunction with IP queuing.

One problem with this approach, however, is that for IP sessions in Gigabit Ethernet (GE) DSLAM aggregation networks, there is no L2 identifier such as the VPI/VCI at the BRAS upon which to shape all of the traffic to a particular subscriber line. In many cases, the VPI/VCI concept is replaced at L2 with a Virtual Local Area Network (VLAN) that is shared among multiple subscribers. This means that there is no single L1, L2, or L3 data plane field (e.g., IP address, MAC address, or portion of a payload) that identifies the subscriber line; hence, there is no identifier for the bundle of traffic which needs shared QoS treatment, e.g., shaping and/or policing.

Thus, what is a needed is a new mechanism for identifying a bundle of data packet traffic that needs shared QoS treatment where there is no single L1, L2, or L3 identifier—one that ensures against indiscriminant drops and data packet collisions.

BRIEF DESCRIPTION OF THE DRAWINGS

The present invention will be understood more fully from the detailed description that follows and from the accompanying drawings, which, however, should not be taken to limit the invention to the specific embodiments shown, but are for explanation and understanding only.

DETAILED DESCRIPTION

A QoS mechanism that enables a logical grouping of sessions to be identified based on snooped control plane information is described. In the following description specific details are set forth, such as device types, protocols, network configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 9:
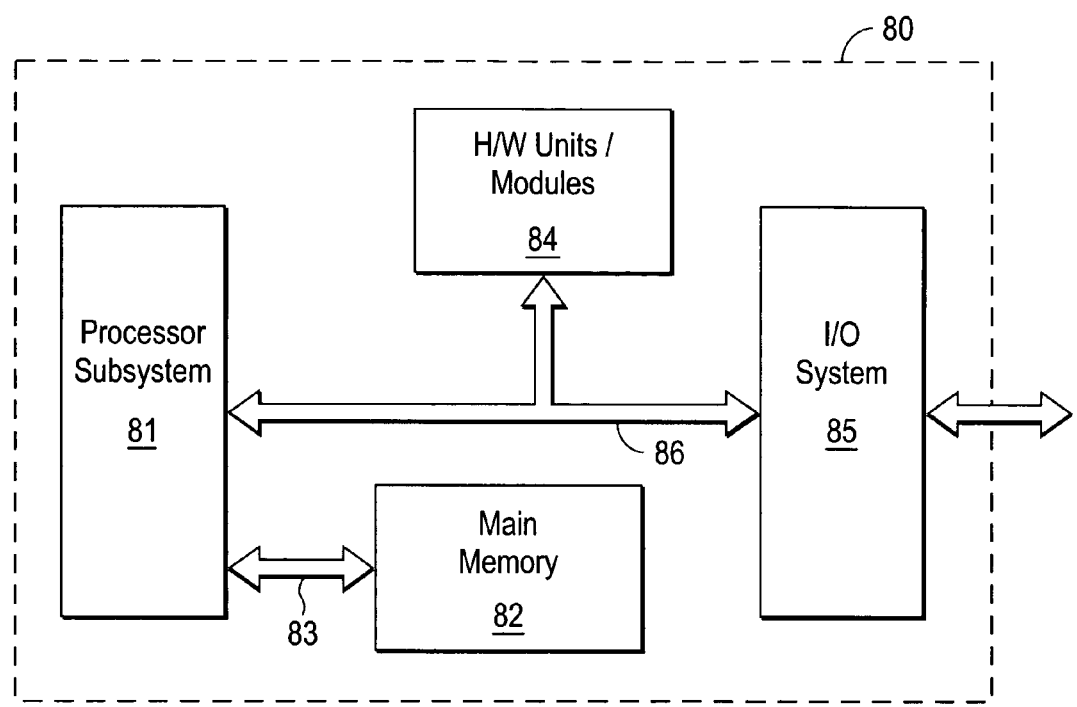
FIG. 9 is a generalized circuit schematic block diagram of a network node.

As shown in FIG. 9, a node 80 typically comprises a number of basic subsystems including a processor subsystem 81, a main memory 82 and an input/output (I/O) subsystem 85. Data is transferred between main memory ("system memory") 82 and processor subsystem 81 over a memory bus 83, and between the processor and I/O subsystems over a system bus 86. Examples of the system bus may include the conventional lightning data transport (or hyper transport) bus and the conventional peripheral component [computer] interconnect (PCI) bus. Node 80 may also comprise other hardware units/modules 84 coupled to system bus 86 for performing additional functions, e.g., shaping and/or policing. Alternatively, these functions may be performed by one or more processors of subsystem 81. Processor subsystem 61 typically comprises one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of the system bus to access a next descriptor ring to obtain a next buffer address in the system memory at which it may, e.g., store ("write") data contained in the packet. The DMA engine may need to issue many write operations over the system bus to transfer all of the packet data.

According to one embodiment of the present invention, an Internet Subscriber Gateway (ISG) device such as a BRAS snoops control plane traffic for a logical port identifier that allows traffic having varying data plane information (e.g., multiple IP or MAC addresses) to be treated as a single group for QoS purposes. For example, shaping may be based on the logical identity of the snooped access link, which allows multiple users of a single DSL line or pipe (multiple ISP sessions) to be bundled together and managed as a single entity from a QoS perspective despite the lack of a dedicated L2 data path all the way back to the BRAS. This removes shaping and queuing requirements from the DSLAM, FFTH, or other non-QoS capable L2 aggregation devices.

Practitioners in the arts will understand that the term "data plane" refers to capacity and performance issues involved with the data physically traversing the network, while the term "control plane" refers to resources required to maintain proper functionality of the data plane. Control plane functionality typically includes service overhead such as routing, spanning tree, and management of the device. Like the data traffic that traverses the network, control plane requirements utilize processor, memory, buffering, queuing, and bandwidth resources. The term "snooping" is also well-known and generally refers to the act of monitoring and identifying traffic passing over a bus or through an interface. In the context of the present invention, a session group is broadly defined as a bundle of IP or MAC sessions against which QoS policies can be applied. An IP session is defined by traffic to or from a particular IP address or subnet and a MAC session is defined by traffic to or from a particular MAC address.

In one embodiment, DHCP relay agent information (Option 82) is utilized to acquire the identity of an L2 access link (e.g., customer premises equipment (CPE) to DSLAM) in a BRAS device via snooping of control plane information. DHCP Option 82 enables a DHCP relay agent (such as a DSLAM) to include circuit identification (ID) information about itself when forwarding subscriber-oriented DHCP packets to a DHCP server (such as a BRAS). The information sent in the ID may include information about the DSL line and the permanent virtual circuit (PVC) connection that comprises the L2 link. For example, DHCP Option 82 information contains the L2 endpoint identifier (Network Access Server (NAS) port) of the DSLAM. That is, the NAS port of the DSLAM is populated into DHCP Option 82 information that is send to the BRAS. Shaping policies are then applied at the BRAS to a logical grouping of multiple IP or MAC sessions where the grouping is based on the DHCP Option 82 information received.

In addition, other protocols, like the Point-to-Point Protocol (PPP) can also contain a logical port identifier (e.g., a PPP tag inside a PPP over Ethernet (PPPOE) active discovery request message) that may be used with, or separately from, DHCP Option 82 such that PPP and DHCP-based traffic can be shaped together as a session group. In other embodiments, shaping of L2 sessions may be based on a grouping of other arbitrary items, information, or parameters, e.g., NAS port, IP address, MAC address, subnet, etc.

Figure 1:
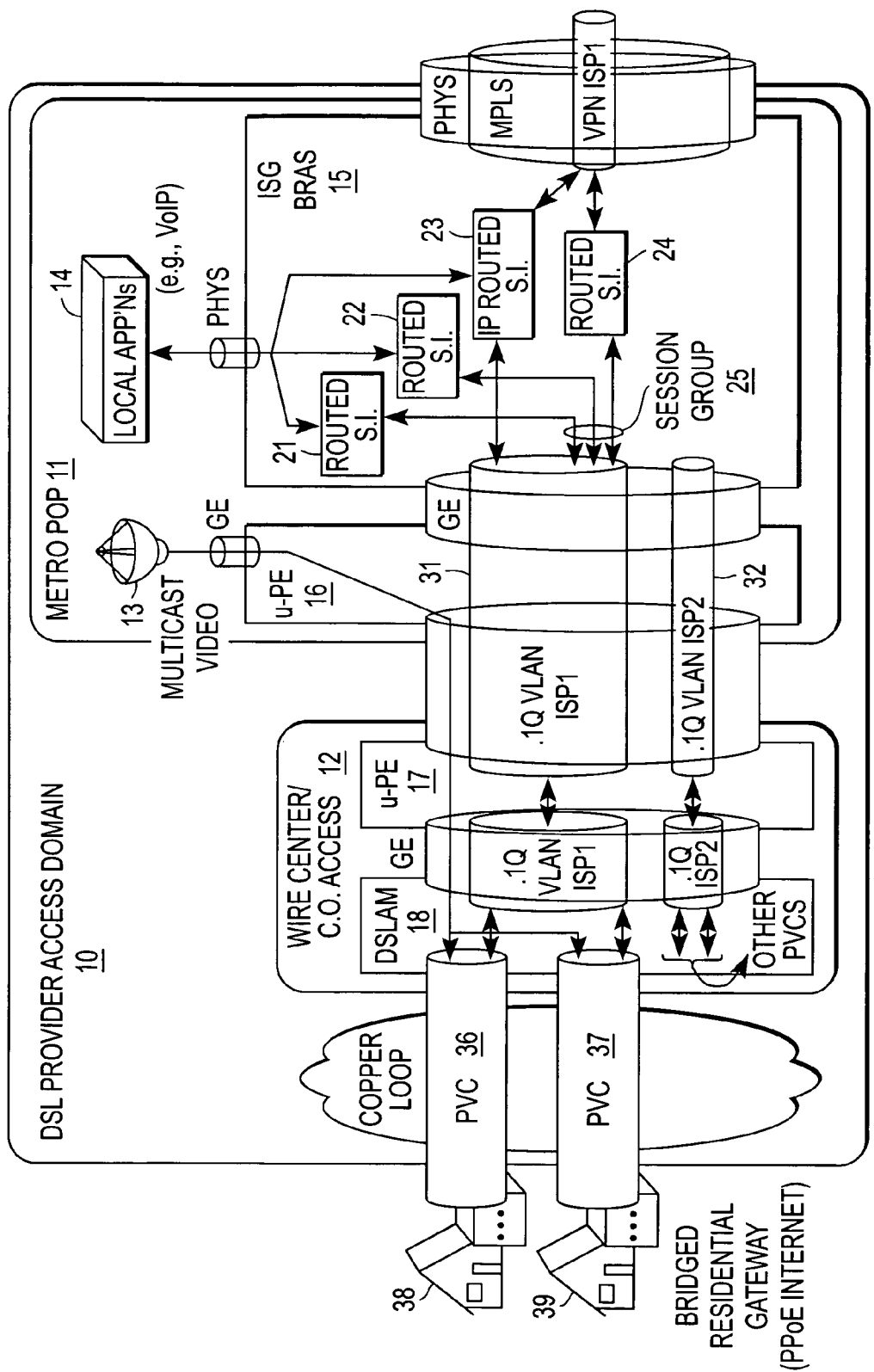
FIG. 1 is a diagram showing an exemplary end-to-end context for a session group in accordance with one embodiment of the present invention.

FIG. 1 is a diagram of a user network interface to a local access domain of a service provider network in accordance with one embodiment of the present invention. A DSL provider access domain 10 includes a metro point of presence (POP) 11 having a BRAS device 15 coupled via a gigabit Ethernet (GE) connection with a user-facing provider edge (u-PE) device 16. BRAS 15 is a device that terminates remote users at the corporate network or Internet users at the Internet service provider (ISP) network, and may provide firewall, authentication, and routing services for remote users. BRAS 15 may also be coupled with many DSLAMs and is used for aggregating or concentrating subscriber traffic in a single place or node on the SP network. In this particular example, BRAS device 15 is also shown coupled to transmit data packet traffic with one or more local applications (e.g., VOIP) represented by box 14.

Included in BRAS device 15 are routed sub-interfaces 21-24, each of which provides a connection with either a SP network, such as a virtual private network (VPN) connection with ISP1, or local applications 14. Each of sub-interfaces 21-24 is shown connected with a DSLAM 18 through u-PE 17 via a path (e.g., VLAN 31, ISP 1) operating in accordance with the IEEE 802.1Q specification, which defines a standard for Virtual LAN and its associated Ethernet frame format. In this example, DSLAM 18 and u-PE 17 are both associated with a wire center 12. FIG. 1 also shows a multicast video stream feed from satellite 13 connected to DSLAM 18 via u-PE devices 16 & 17. Additional paths (e.g., VLAN 32, ISP 2) may also be terminated at BRAS 15.

DSLAM 18 is shown connected with customer premises 38 and 39 via PVCs 36 and 37, respectively. A PVC is essentially a fixed virtual circuit (VC) between two network devices that functions as the public data network equivalent of a leased line—encapsulated within a Layer 2 protocol. However, it should be understood that PVC is not required for implementing the present invention. Instead of a PVC, the connection protocol could, for example, be native Ethernet over DSL. Premises 38 & 39 may each comprise asymmetric digital subscriber line (ADSL) modems, which are often referred to as an ATU-R (ADSL Terminal Unit-Remote). In the example of FIG. 1, ATU-R units may provide DSL physical layer encoding of bits for transport over copper telephone wires. Together, the CPE and ATU-R units associated with premises 38 & 39 may be considered as providing a bridged residential gateway (RG) to the SP network. It is appreciated that other embodiments may utilize other Layer 1 transport mechanisms, such as FTTH or WIMAX.

In the embodiment of FIG. 1, PPPOE and IP sessions comprise a subscriber session group 25 within BRAS 15. Treating the traffic of various sessions as a group 25 in this example allows for QOS functions such as policing and shaping of all traffic to/from the subscriber line based on a single logical identifier that is obtained by snooping of the subscribers' control plane traffic, regardless of encapsulation. In accordance with one aspect of the present invention, groups of PPP sessions may be determined by PPP-tag information, and groups of IP sessions may be determined by DHCP Option 82 information. Mixed groups of IP and PPP sessions may be determined by PPP-tag and DHCP Option 82 information, respectively. In alternative embodiments, other current and future session types (e.g., Static IP addresses, MAC sessions, etc.) may be determined by appropriate logical identifiers.

It should be understood that the hardware of BRAS 15 may not use the control plane information in its actual QoS algorithms. Instead, the hardware is typically informed of a set of IP address, MAC address, and other data plane field combinations that will be sent to a common QOS function such as a shaper or policer; it is the set of these combinations that comprise session group 25 from the standpoint of the hardware in BRAS 15.

Figure 2:
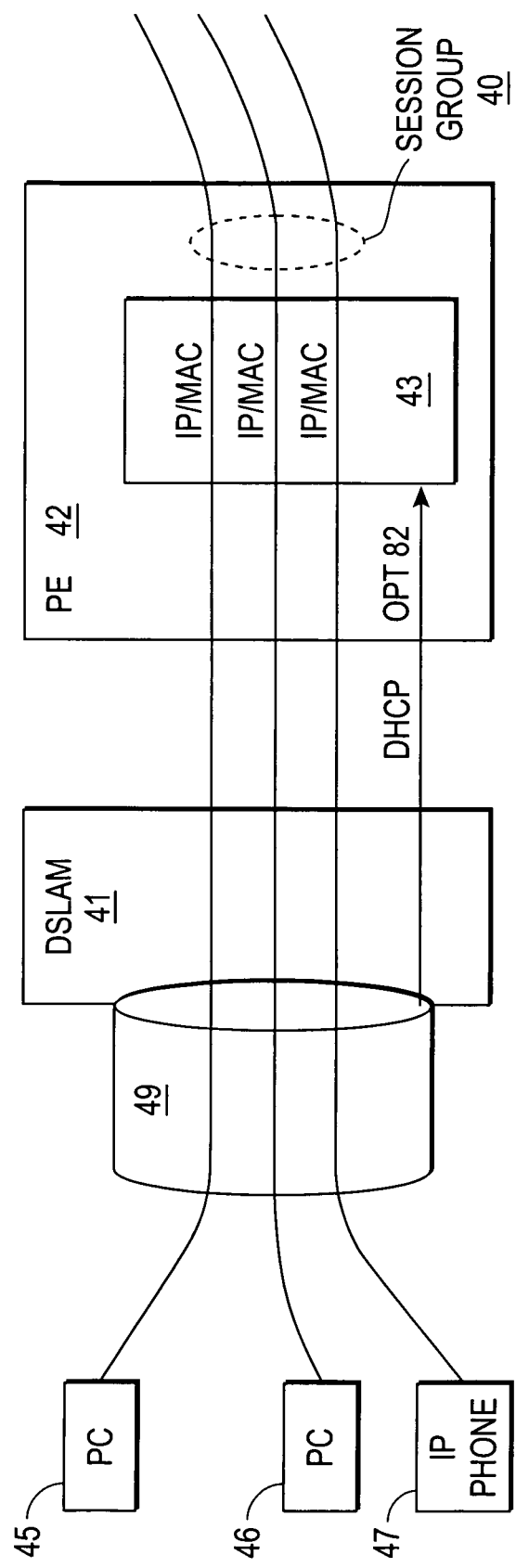
FIG. 2 is a simplified conceptual diagram of a service provider network connection with a subscriber that illustrates the grouping of sessions in accordance with one embodiment of the present invention.

Furthermore, a session group need not come into existence until more than one subscriber session is seen on a single physical link from the subscriber's premises. FIG. 2 is a conceptual diagram of a service provider network that illustrates the grouping of three subscriber sessions in accordance with one embodiment of the present invention. In this example, a single physical link (port) 49 is shown connecting a DSLAM 41 with a subscriber running three sessions: one session each on personal computers (PCs) 45 & 46, and a third session on an IP phone 47. Each of these three sessions may have an associated IP/MAC address with the data rate of the traffic flow for the session group 40 being shaped by a shaping unit 43 in a provider edge (PE) device 42 of the SP network. For example, if the DSL physical rate for port 49 happens to be 1 Mb/sec, shaping unit 43 assigned to that port would shape the traffic flow to PCs 45 & 46 and IP phone 47 so as to avoid overwhelming the 1 Mb/sec capacity of the single physical link to the subscriber. In other words, shaping is performed in PE device 42 on a group of sessions 40 that happen to correlate to a particular downstream L2 link.

In the diagram of FIG. 2, even though VC information is lost between DSLAM 41 and PE device 42 at the data packet level, control plane information is utilized to identify those sessions to be aggregated into a subscriber session group to satisfy QoS requirements. In this example, control plane information is snooped from DHCP Option 82, which provides a logical identifier for a subscriber facing physical access port of DSLAM 41. As previously discussed, PPP tag information may also be utilized as a logical identifier for PPPoE-based sessions. In cases where both PPPOE and IP sessions come from the subscriber on the same physical port, PPP tag and DHCP Option 82 information may both be utilized.

It is appreciated that in other implementations, DSLAM 41 may be substituted with an optical line termination (OLT) device, a first Ethernet to the home, business, or campus (ETTX) device, or some other broadband access device.

Figure 3:
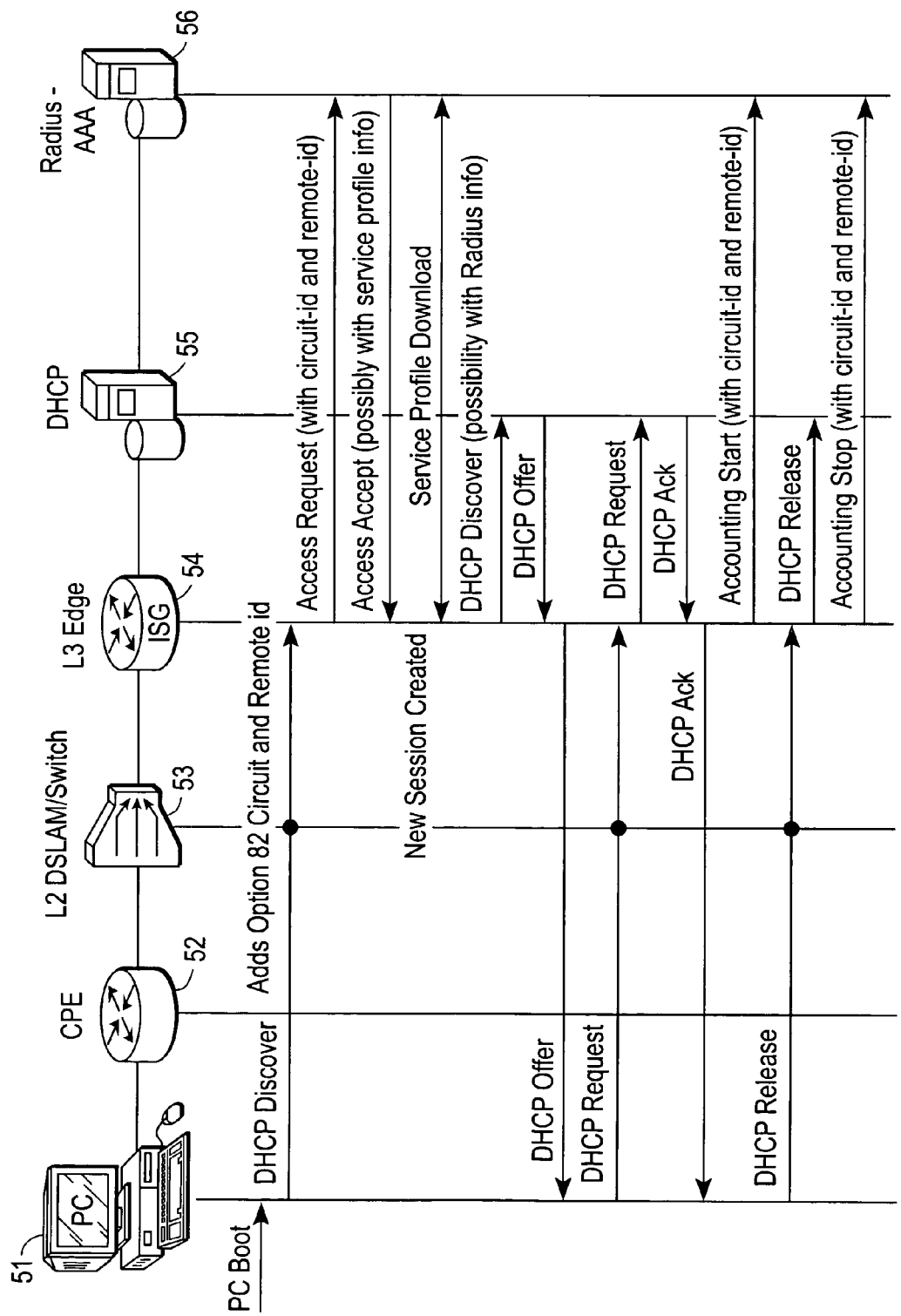
FIG. 3 is a network diagram that illustrates the use of DHCP Option 82 in accordance with one embodiment of the present invention.

FIG. 3 illustrates a typical DHCP flow with Option 82 information inserted in the discovery message sent from L2 DSLAM/Switch 53 to L3 edge device 54, in accordance with one embodiment of the present invention. A subscriber PC 51 is shown linked with L2 DSLAM/Switch 53 via CPE device 52. In this example, the NAS port associated with the subscriber link is populated with DHCP Option 82 information. At the SP network, L3 edge device 54 is connected a DHCP server 55, which, in turn, connects with an AAA server 56. AAA server 56 functions as a single source facility or database for storing user information that typically includes user identity and authorization credentials. AAA server 56 is also typically referred to as a RADIUS server, since the RADIUS protocol is the current standard by which devices or applications communicate with the AAA server.

Figure 4:
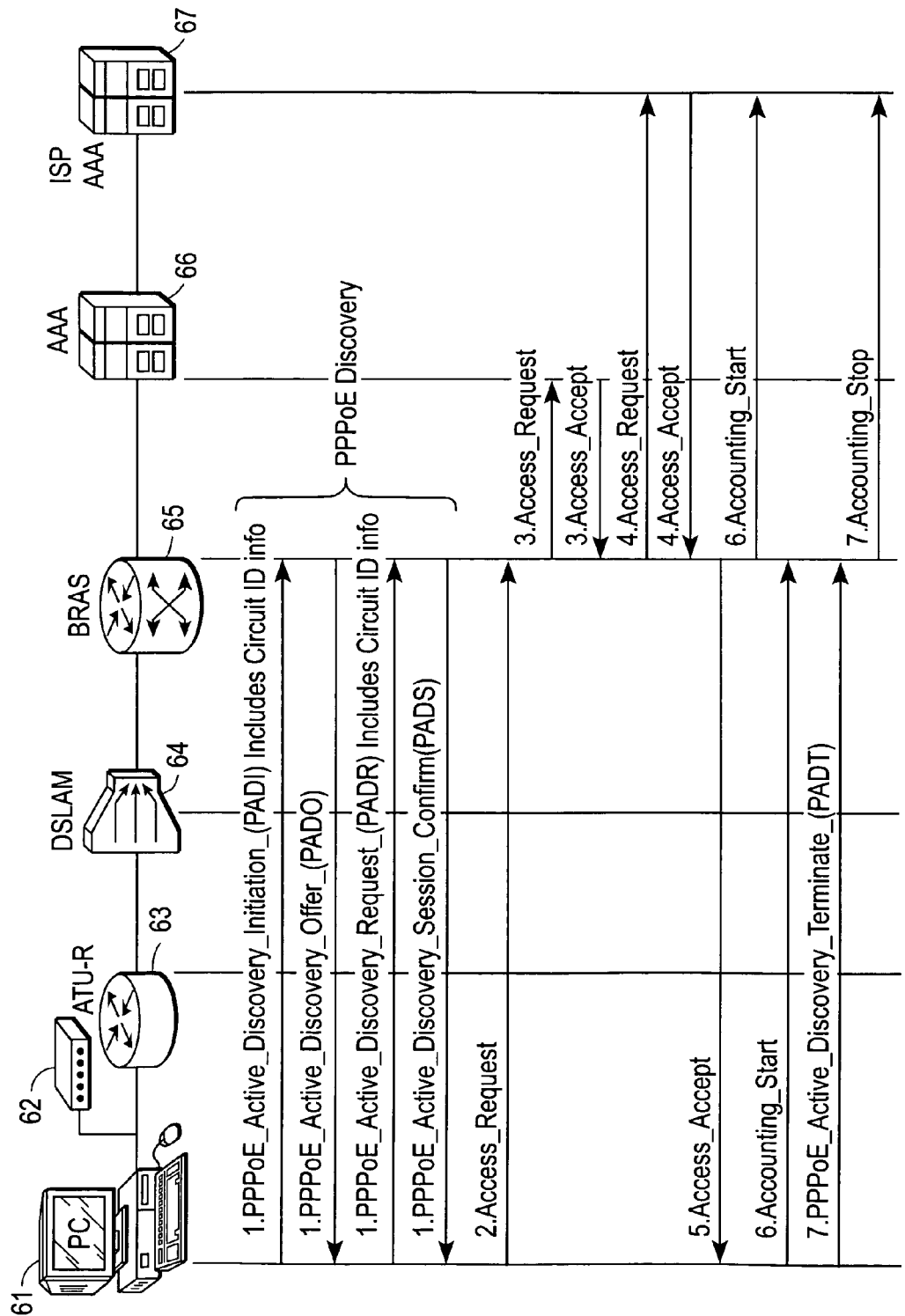
FIG. 4 is a network diagram that illustrates a mechanism for identifying session groups in accordance with another embodiment of the present invention.

FIG. 4 is a network diagram that illustrates a mechanism for identifying session groups in accordance with another embodiment of the present invention. In the embodiment of FIG. 4, a PPP tag (as defined in DSL Forum 2004-071) identifies the physical port of DSLAM 64 that provides subscriber network access. The residential gateway in FIG. 4 is shown including a PC 61 connected with an ATU-R unit 62 and CE device 63. CE device connects with DSLAM 64, which, in turn, is shown connected to a BRAS 65. Further upstream, BRAS 65 is shown connected with an AAA server 66, which, in turn is connected with an Internet Service Provider (ISP) AAA server 67. It should be understood that ISP AAA server 67 is an optional device in the network topology of FIG. 4. ISP AAA server 67 is shown connected with AAA server 66 since, in certain cases, it may be desirable to validate a user's credentials and other user information with other companies (e.g., Internet access providers) to control access to their subscriber databases.

As can be seen, in FIG. 4 PPP tag information is delivered to BRAS 65 in both PPPOE Active Discovery Initiation (PADI) and PPPOE Active Discovery Request (PADR) messages. The default syntax used for the agent circuit-ID filed by access nodes mimics a typical practice often used by BRAS DHCP relay agents (using the agent circuit-ID sub-option in DHCP Option 82) and BRAS RADIUS clients (using the NAS-Port-ID attribute). Since the PADI & PADR transactions occur with BRAS 65 in both PPP Terminated Aggregation (PTA) and Layer 2 Tunneling Protocol (L2TP) Network Server (LNS) models, the same mechanism can be used to identify session groups for retail and wholesale BRAS scenarios.

Figure 5:
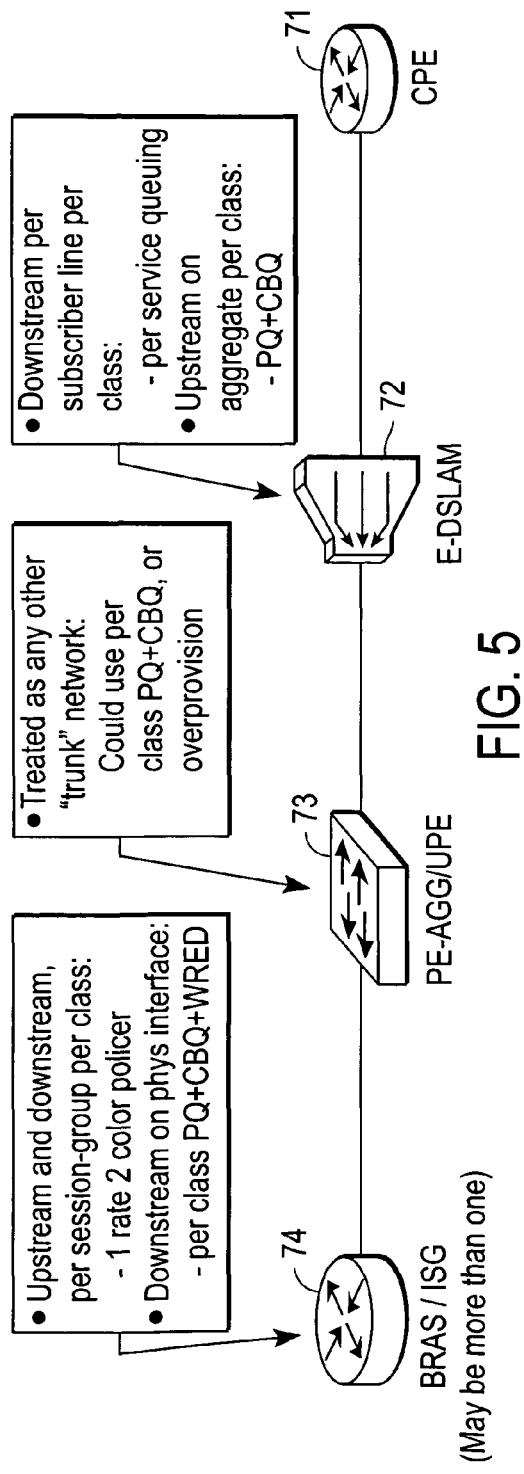
FIG. 5 is a network diagram a QoS model and session group in accordance with one embodiment of the present invention.

FIGS. 5-8 are network diagrams, each showing a QoS model and session groups according to an exemplary embodiment of the present invention. Each diagram shows a CPE device 71 connected with an Ethernet DSLAM (E-DSLAM) 72, which, in turn, is connected with one or more BRAS/ISG devices 74 via an aggregate provider edge (PE-AGG)/u-PE device 73. FIG. 5 illustrates a static queuing configuration at E-DSLAM 72, which may be based upon traffic classification using the IEEE 802.1P specification. Another option is a VLAN-VC map, where there are different VCs for different services from CPE 71 to E-DSLAM 72; and IEEE 802.1P-VC mapping within the DSLAM to allow different types of traffic to receive different ATM QoS treatment on the access link.

In the model of FIG. 5 upstream and downstream policing is provided at BRAS 74 per session group per class. Dynamic QoS configuration downstream on the physical interface may be per class utilizing priority queuing (PQ), Class-Based Queuing (CBQ), and/or Weighted Random Early Detection (WRED) mechanisms.

Figure 6:
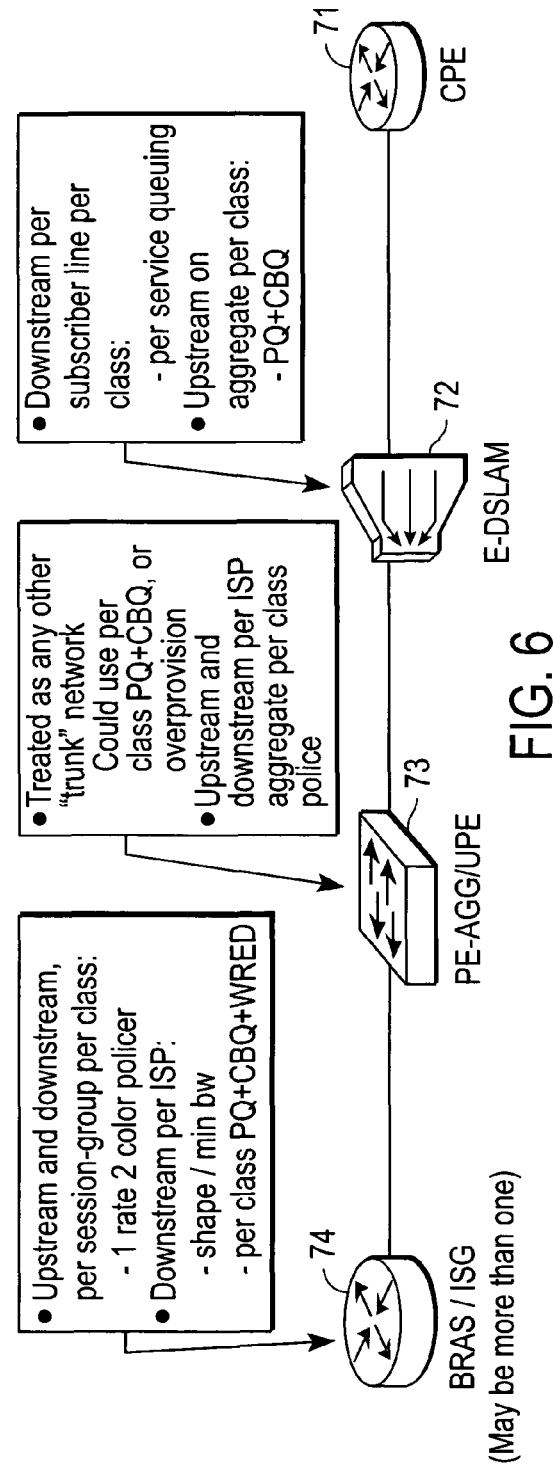
FIG. 6 is a network diagram a QoS model and session group in accordance with another embodiment of the present invention.

The model shown in FIG. 6 is simply a superset of the functionality shown in the model of FIG. 5, with the addition of a Virtual Path (VP) tunnel equivalent.

Figure 7:
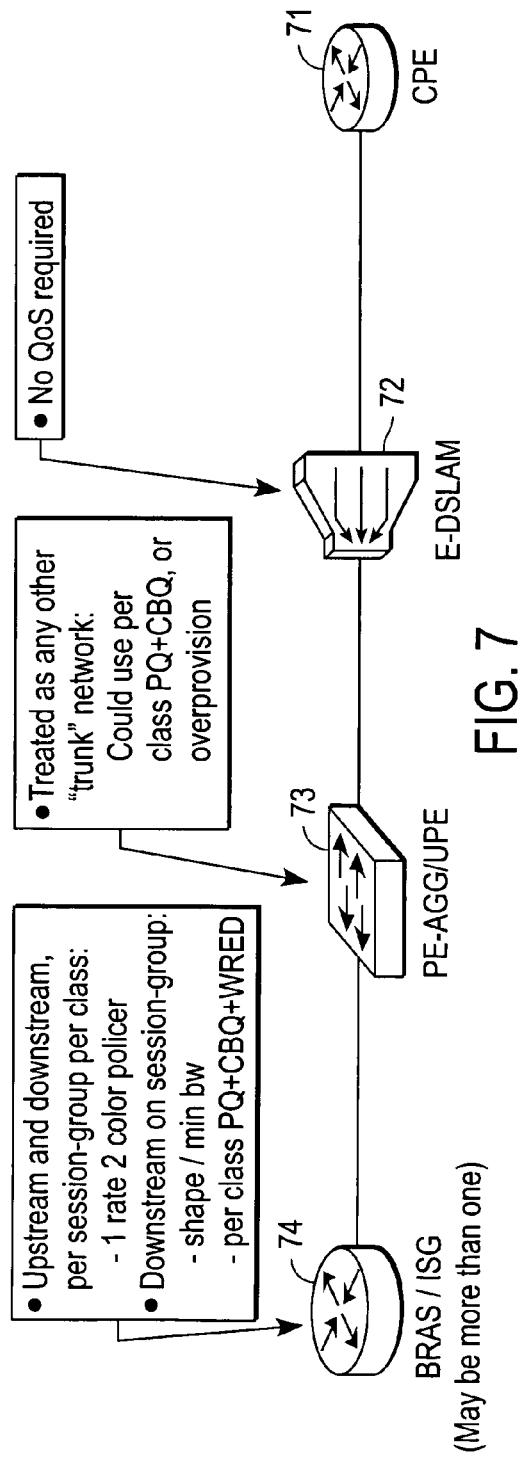
FIG. 7 is a network diagram a QoS model and session group in accordance with yet another embodiment of the present invention.

FIG. 7 shows a QoS model equivalent to the ATM model with shaped VCs, but with no shaped VPs. Importantly, in the model of FIG. 7 there are no QoS functions performed at E-DSLAM 72; that is, all QoS control resides at BRAS 74 based upon session group identification.

Figure 8:
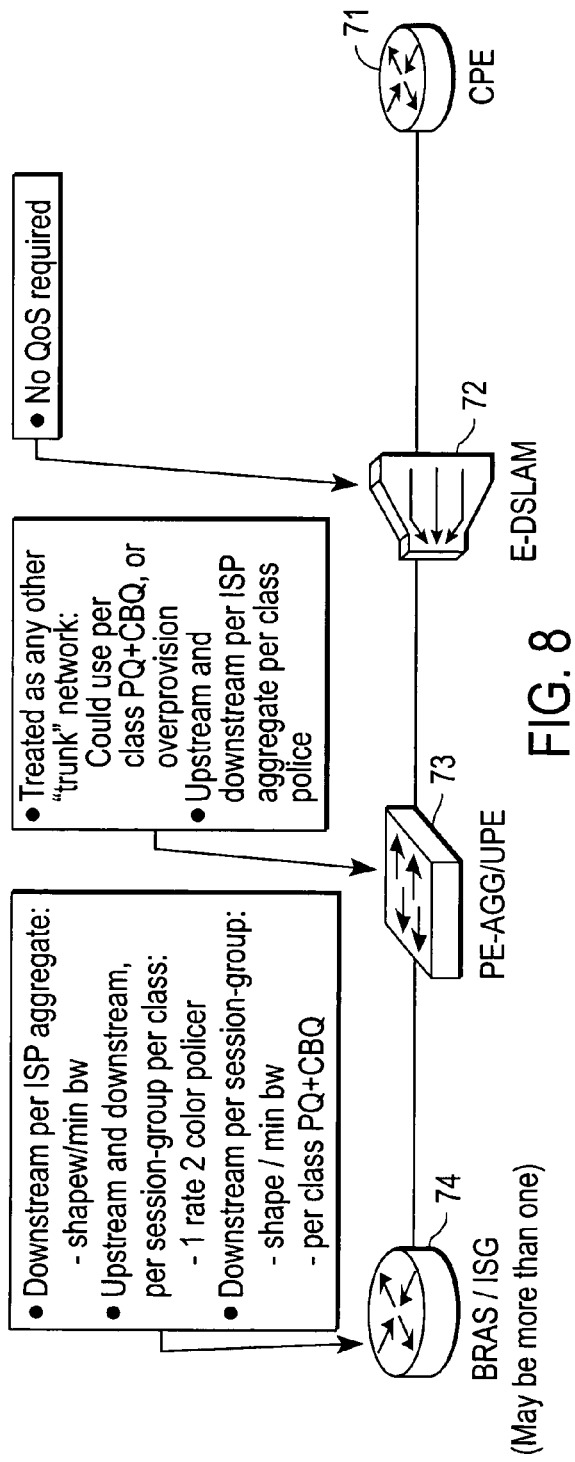
FIG. 8 is a network diagram a QoS model and session group in accordance with still another embodiment of the present invention.

Finally, FIG. 8 is a diagram of a QoS model in accordance with one embodiment of the present invention which is functionally equivalent to the ATM model with shaped VPs and shaped VCs, with no QoS functions being performed at the DSLAM. In the model of FIG. 8, as in FIG. 7, all QoS control is at the BRAS/ISG device.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred to a node or switch by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A provider edge (PE) device that provides subscribers with access to an Internet Service Provider (ISP) network, the subscribers being connected to the PE device via a broadband aggregation device, the PE device comprising:
   a processor;
   a memory including instructions stored thereon and executable by the processor to snoop control plane traffic for a logical identifier that contains information about an access link from customer premises equipment associated with the subscribers to the broadband aggregation device, and to instantiate a session group that includes multiple sessions based on the logical identifier and to shape traffic flow associated with the session group.

2. The PE device of claim 1 wherein the traffic flow comprises a plurality of Internet Protocol (IP) sessions and the access link comprises a Layer 2 (L2) access link.

3. The PE device of claim 1 wherein the traffic flow comprises a plurality of Point-to-Point Protocol over Ethernet (PPPoE) sessions and the access link comprises a Layer 2 (L2) access link.

4. The PE device of claim 1 wherein the traffic flow comprises a plurality of sessions and the access link comprises a Layer 2 (L2) access link, the sessions including at least one Internet Protocol (IP) session & and at least one Point-to-Point Protocol over Ethernet (PPPoE) session.

5. The PE device of claim 1 wherein the logical identifier comprises a circuit-ID of the broadband aggregation device and the traffic flow comprises Dynamic Host Configuration Protocol (DHCP) Option 82 Information transmitted from the broadband aggregation device to the PE device.

6. The PE device of claim 1 wherein the logical identifier comprises a circuit-10 of the broadband aggregation device end the traffic flow comprises Point-to-Point Protocol over Ethernet (PPPoE) tag Information transmitted from the broadband aggregation device to the PE device.

7. The PE device of claim 1 wherein the logical identifier comprises a circuit-ID of the broadband aggregation device and the traffic flow comprises Point-to-Point Protocol over Ethernet (PPPoE) tag and Dynamic Host Configuration Protocol (DHCP) Option 82 Information transmitted from the broadband aggregation device to the PE device.

8. The PE device of claim 1 wherein the broadband aggregation device comprises a Digital Subscriber Line Access Multiplexer (DSLAM) device.

9. A Broadband Remote Access Server (BRAS) device for association with an access network, the BRAS device comprising:
a port to transmit a plurality of sessions to a subscriber, the sessions including Point-to-Point Protocol over Ethernet (PPPoE) sessions, the port for connecting with a Digital Subscriber Line Access Multiplexer (DSLAM) device that connects with the subscriber via a Layer 2 (L2) access link;
processor;
a memory including instructions stored thereon and executable by the processor to snoop upstream traffic from the DSLAM to the BRAS for a logical identifier that includes information about the L2 access link, the processor using the Information to instantiate a session group comprising the multiple sessions, the information comprising Dynamic Host Configuration Protocol (DHCP) Option 82 information and a to shape traffic flow associated with the session group based on the information.

10. The BRAS device of claim 9 wherein the sessions further include a plurality of Internet Protocol (IP) sessions.

11. The BRAS device of claim 9 wherein the L2 access link comprises a permanent virtual circuit (PVC) connection.

12. The BRAS device of claim 9 wherein the information further comprises Point-to-Point Protocol over Ethernet (PPPoE) tag information.

13. A broadband aggregation network, comprising:
a broadband access device having a port that connects with a subscriber premises device, the broadband access device being operable to transmit a plurality of sessions to subscribers;
an Internet subscriber gateway (ISG) device coupled to the broadband access device, the ISG device including:
a processor; and
a memory including instructions stored thereon and executable by the processor to snoop control plane traffic of a subscriber for a logical port identifier of the broadband access device, the logical port identifier including a circuit-ID of the broadband aggregation device and the control plane traffic flow comprising Dynamic Host Configuration Protocol (DHCP) Option 82 information transmitted from the broadband aggregation device to the ISG device, the instructions also to traffic shape the sessions as a single logical group based on the logical port identifier.

* * * * *